(12) United States Patent
Chu et al.

(10) Patent No.: US 9,076,367 B2
(45) Date of Patent: Jul. 7, 2015

(54) COLOR MANAGEMENT FOR WEB SERVER BASED APPLICATIONS

(75) Inventors: Alan Chu, Santa Clara, CA (US); Sing Yeung Lai, Santa Clara, CA (US); On Loy Sung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/607,653

(22) Filed: Sep. 7, 2012

(65) Prior Publication Data

US 2014/0071149 A1    Mar. 13, 2014

(51) Int. Cl.
  *G09G 5/02*    (2006.01)
  *G06F 3/14*    (2006.01)

(52) U.S. Cl.
  CPC .. *G09G 5/02* (2013.01); *G06F 3/14* (2013.01); *G09G 2370/022* (2013.01); *G09G 2370/027* (2013.01)

(58) Field of Classification Search
  CPC ........................................ G09G 5/02
  USPC ........................................ 345/589
  See application file for complete search history.

(56) References Cited

U.S. PATENT DOCUMENTS

| | | | |
|---|---|---|---|
| 6,309,117 B1 * | 10/2001 | Bunce et al. | 400/61 |
| 7,119,760 B2 | 10/2006 | Edge et al. | |
| 7,652,676 B2 | 1/2010 | Hayward | |
| 2001/0052998 A1 * | 12/2001 | Kiyosu et al. | 358/1.15 |
| 2002/0003903 A1 * | 1/2002 | Engeldrum et al. | 382/233 |
| 2002/0015044 A1 * | 2/2002 | Edge et al. | 345/600 |
| 2002/0041287 A1 * | 4/2002 | Engeldrum et al. | 345/589 |
| 2002/0080168 A1 * | 6/2002 | Hilliard et al. | 345/744 |
| 2002/0120781 A1 * | 8/2002 | Hirashima et al. | 709/246 |
| 2002/0161803 A1 * | 10/2002 | Shelton | 707/528 |
| 2002/0161835 A1 * | 10/2002 | Ball et al. | 709/203 |
| 2002/0165881 A1 * | 11/2002 | Shelton | 707/526 |
| 2002/0180751 A1 * | 12/2002 | Rozzi | 345/589 |
| 2006/0152747 A1 * | 7/2006 | Kiyosu et al. | 358/1.9 |
| 2006/0164684 A1 * | 7/2006 | Kiyosu et al. | 358/1.15 |
| 2006/0250411 A1 | 11/2006 | Oh | |
| 2006/0274342 A1 * | 12/2006 | Haikin et al. | 358/1.9 |
| 2008/0150960 A1 * | 6/2008 | Edge et al. | 345/600 |
| 2009/0027415 A1 * | 1/2009 | Dispoto et al. | 345/604 |
| 2009/0109237 A1 * | 4/2009 | Ten | 345/600 |
| 2011/0115809 A1 * | 5/2011 | Hilliard et al. | 345/589 |
| 2011/0249015 A1 | 10/2011 | Lonkar | |

OTHER PUBLICATIONS w3schools, CSS Text, Feb. 12, 2010, www.w3schools.com/CSS/css_text.asp, pp. 1-4.*

(Continued)

*Primary Examiner* — David Zarka
*Assistant Examiner* — Brian Kravitz
(74) *Attorney, Agent, or Firm* — Downey Brand LLP

(57) ABSTRACT

Method and apparatus for color management of documents retrieved and manipulated by a server based application and displayed on a client device through a browser application. Page elements of documents are manipulated to provide consistent and/or accurate color reproduction on the client device. Pages include untagged images, images tagged with color profiles, and tagged or untagged page elements specified by hex color values. Color values for images and untagged page elements specified by hex color values are adjusted by the server application before transmission to the client device to account for properties of browser applications and operating systems of different client devices.

24 Claims, 16 Drawing Sheets

(56) References Cited

OTHER PUBLICATIONS

Helios, ImageServer UB+, Dec. 26, 2009, www.helios,de/web/EN/products/HELIOS-ImageServer.html, pp. 1-4.*

Ballard, Professional Color Management CS5 Photoshop Basic Color Theory, Feb. 15, 2011, www.gballard.net, pp. 1-12.*

Buckley et al, Color Imaging on the Internet, Sep. 30, 2001, The Society for Imaging Science and Technology, pp. 1-97.*

Mattox, True Internet Color Server: Server Solution for Web Color Consistency, 1999, E-Color, Inc, pp. 1-5.*

Lungu et al., "Information System for Administrating and Distributing Color Images Through Internet," Informatica Economica, nr. 1 (41) 2007, pp. 7-13.

Stokes et al., "A Standard Default Color Space for the Internet—sRGB," HP Microsoft, Ver. 1.10, Nov. 5, 1996, http://www.w3.org/Graphics/Color/sRGB.html, 18 pages, downloaded Mar. 27, 2012.

Celik et al., "CSS Color Module Level 3," W3C Proposed Recommendation Oct. 28, 2010, http://www.w3.org/TR/2010/PR-css3-color-20101028, 25 pages, downloaded Mar. 28, 2012.

\* cited by examiner

| Transformation | Color Management | Source Color Profile | Source RGB Value | PCS CIEXYZ Value | Display Color Profile | Display RGB Value |
|---|---|---|---|---|---|---|
| 1302 | N | N/A | (Rs1,Gs1,Bs1) | N/A | N/A | (Rs1,Gs1,Bs1) |
| 1304 | Y | sRGB | (Rs1,Gs1,Bs1) | (x1,y1,z1) | sRGB | (Rs1,Gs1,Bs1) |
| 1306 | Y | SRGB | (Rs1,Gs1,Bs1) | (x1,y1,z1) | Device RGB | (Rd1,Gd1,Bd1) |
| 1308 | Y | Adobe RGB | (Rs2,Gs2,Bs2) | (x1,y1,z1) | sRGB | (Rs1,Gs1,Bs1) |
| 1310 | Y | Adobe RGB | (Rs1,Gs1,Bs1) | (x2,y2,z2) | sRGB | (Rd2,Gd2,Bd2) |
| 1312 | N | N/A | (Rs2,Gs2,Bs2) | N/A | N/A | (Rs2,Gs2,Bs2) |

Figure 13

COLOR MANAGEMENT FOR WEB SERVER BASED APPLICATIONS

TECHNICAL FIELD

The described embodiments generally relate to methods and apparatuses for managing colors for applications operating on a server and accessed through a web browser on a client device. More particularly, the present embodiments describe modifications at a server to elements of pages/documents retrieved by the client device to manage colors when the pages/documents are displayed on the client device.

BACKGROUND

Portable computing devices have enabled users to carry a suite of applications and associated documents from office to home to vacation spots. For documents and applications co-resident on a given computing device (and associated locally connected storage device), a document can be processed on the computing device to display on one or more displays integrated with or linked to the computing device. The user can achieve consistent and accurate color reproduction for the documents using applications and operating systems that support color management of elements contained in the documents, e.g. applications for processing digital images generated by digital cameras or by film scanners and presented on a calibrated display monitor or printer system. Color management can provide a method to reproduce a document consistently and accurately across different computing devices, typically through the use of a combination of operating system software, application software, standardized generic color profiles and device specific color profiles for source devices and display devices. Accurate color can require generating and maintaining the device specific color profiles for a particular display device or printing system. An approximation of accurate color can be achieved by using generic color profiles to which display devices can be calibrated by a manufacturer, such as to the well known International Color Consortium (ICC) standardized sRGB color profile. Different elements of a document can by handled differently by a software application and/or operating system, so that portions of the document can be "color managed" through specific color profiles, while other elements can be unmanaged and sent to the display directly. Color profiles embedded with elements of a document (e.g. an image) can inform a color management system how to display a color, while stripping embedded color profiles can result in the element being displayed based on a default profile. Achieving color consistency among several different elements in a document can prove frustrating for a user, as the same document can appear differently in different applications, through different operating systems and on different computing devices. Meanwhile, the rise of the internet and World Wide Web has promoted the sharing of documents among multiple users across a broad variety of computing devices, and "cloud" based storage and computing introduces the complication that a single document can include elements generated by one user, uploaded to the "web" for storage, manipulated by another user (on a local or remote device) and downloaded for display by an additional user. Color management for elements of documents when the generation, manipulation and display can occur on multiple different computing devices can prove quite challenging. Thus, there exists a need for a method to color manage documents that can be stored and manipulated by applications on a server while being accessed by a remote client device through a web browser.

SUMMARY OF THE DESCRIBED EMBODIMENTS

In one embodiment, a method of managing colors at a server for page elements of a page to be displayed on a client device is described. The method includes at least the following steps performed at the server. In a first step, the server receives a command from the client device to retrieve the page. The server converts page elements in the page to a common color profile, the page elements including at least an image tagged with a color profile and a page element specified by a numerical color value without a color profile. After conversion, the server transmits a modified page to the client device, the modified page including the converted page elements to display on the client device. In an embodiment, the common color profile is a standardized ICC sRGB color profile, and the numerical color value of the page element is a W3C CSS RGB triple of hexadecimal values.

In another embodiment, an apparatus for color management of page elements displayed on a client device is described. The apparatus includes at least a receiving module, a processing module and a transmitting module. The receiving module is configured to receive a command from the client device to retrieve a page. The processing module is configured to convert page elements in the page to a common color profile, the page elements including at least an image tagged with a color profile and a page element specified by a numerical color value without a color profile. The transmitting module is configured to transmit a modified page to the client device, the modified page including the converted page elements. In an embodiment, the processing module is further configured to append the common color profile to an untagged image page element in the page before transmitting the modified page to the client device.

In a further embodiment, a computer program product encoded in a non-transitory computer readable medium for managing colors at a server for displaying a page on a client device is described. The computer program product in the mobile wireless device includes the following computer program code. Computer program code for receiving a command from the client device to retrieve the page. Computer program code for converting page elements in the page to a common color profile, the page elements including at least an image tagged with a color profile and a page element specified by a numerical color value without a color profile. Computer program code for transmitting a modified page that includes the converted page elements to the client device for displaying on the client device. In an embodiment, the computer program product further includes computer program code for preserving the original color profile of tagged images in the page before transmission to the client device when determined color management settings indicate that the browser supports color management of images and computer program code for converting the color profile of tagged images in the page to the common color profile before transmission to the client device only when the color management settings indicate that the browser does not support color management of images.

BRIEF DESCRIPTION OF THE DRAWINGS

The described embodiments and the advantages thereof may best be understood by reference to the following description taken in conjunction with the accompanying drawings.

FIG. 13 summarizes several different transformations for RGB color values.

DETAILED DESCRIPTION OF SELECTED EMBODIMENTS

Figure 1:
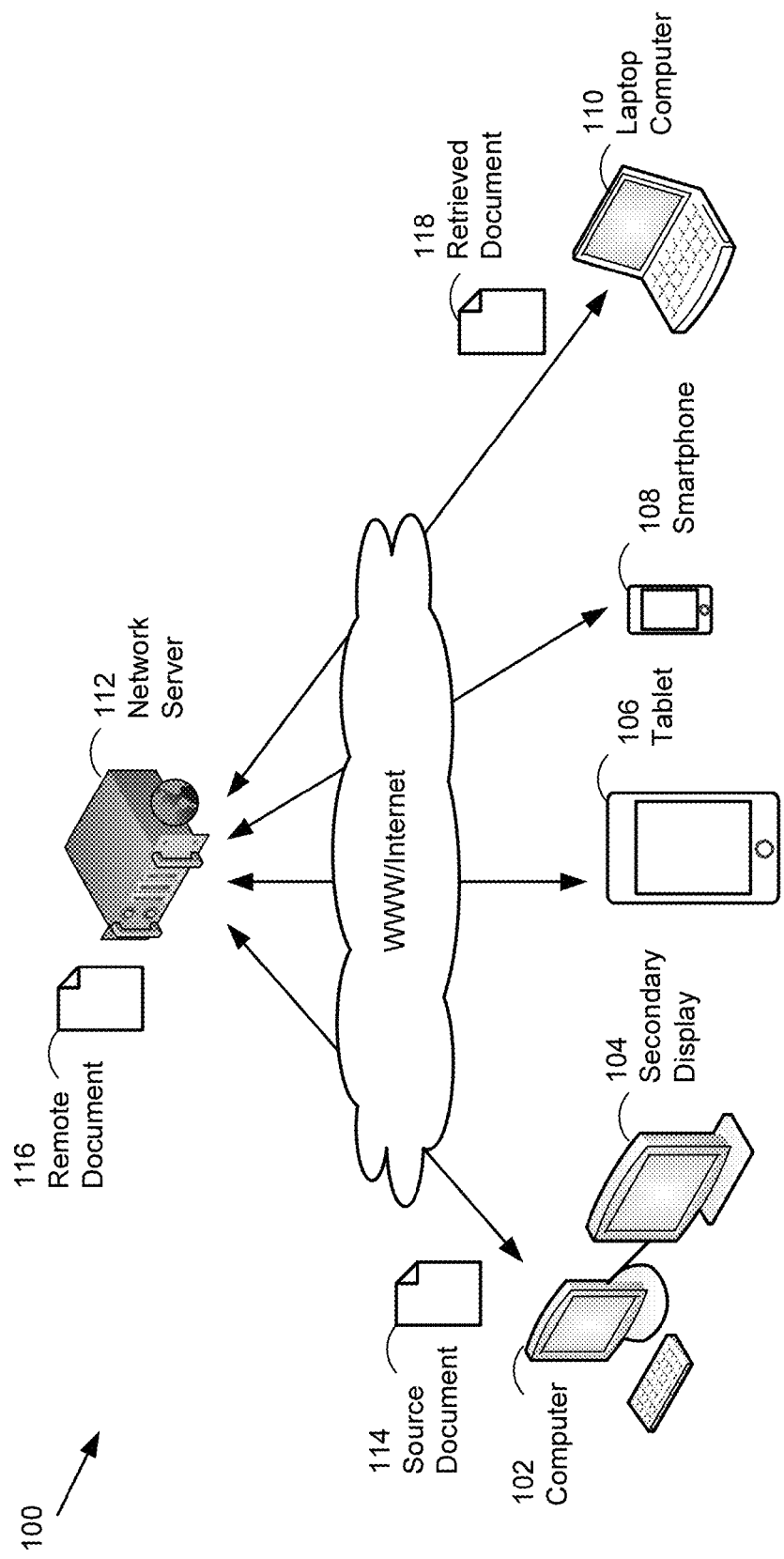
FIG. 1 illustrates a set of computing devices interconnected through a network server to share a document.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for color management of elements of a page/document processed at a server and displayed on a client device connected to the server through the internet. (The terms "document" and "page" are used interchangeably in this patent application to indicate a file or portion thereof that can be generated, manipulated, retrieved and displayed by a computing device connected to a server.) Color management within an application executing on a server in the internet can differ from color management within an application executing on a local computer. The document can be viewed at the client device through a web browser that accesses the server through the internet, and thus the document can be "processed" for color management twice, once at the server before transmission to the client device and a second time at the client device in preparation for display at the client device. The document can include multiple elements such as images, which can be tagged with generic or specific color profiles or can be untagged, and graphical elements that can be specified as RGB values, again with or without an accompanying color profile. Document elements tagged with a color profile can be treated differently from untagged elements, and images can also be handled differently from graphical elements both within the application at the server and by the web browser at the client device. Achieving consistent and accurate color reproduction for the diverse set of elements in a document viewed through a web browser can prove challenging.

With web based storage and processing of documents, a document can be generated, retrieved and/or processed at one computing device and transferred to a separate computing device to be displayed. Each computing device can use a different application for processing and/or viewing the document, and operating systems and displays on each computing device can also vary. The same document stored at and retrieved from a server can be viewed by different users on different computing devices having different configurations of hardware and software. Rather than transmit the document unaltered to each client device, which can result in significant variability in how the document displays on the client device, the application on the server can account for specific characteristics (or assume a set of general characteristics) for the client device and process the documents accordingly before transmitting the document for display to the client device. Viewing the document through a web browser can change the document's appearance depending on the color management capabilities and settings of the web browser used at the client device. In some embodiments, the server application can determine or estimate color management actions that the web browser application and/or the operating system of the client device can perform on the transmitted document. The server application can account for these operations in advance and convert the document at the server before transmission to the client device. The original (unconverted) document can be retained at the server, so that specific information associated with the document remains unaltered. One or more processed versions of the document can also be stored at the server for quick retrieval and transmission to client devices having specific known or assumed color management and display characteristics.

Different web browsers, including different revisions or configurations of the same web browser, can handle color management of elements in documents differently. Some web browsers use no color management, other web browsers implement "partial" color management, e.g. for images tagged with color profiles only, while other web browsers implement a form of "full" color management including both images with color profiles and graphical elements within the document. Typically, web browsers do not color manage graphical elements, e.g. blocks or text specified by a World Wide Web Consortium (W3C) cascading style sheet (CSS) color coding, even though these colors are specified to be interpreted according to the International Color Consortium (ICC) standardized sRGB color profile. When a document that includes both images and graphical elements is displayed through a web browser, matching colors between the image and the graphical element can prove difficult to achieve. If the image and the graphical element are displayed according to different color profiles, then identical RGB values in the image and graphical element can display as different colors. If the image and the graphical elements are specified and displayed according to the same color profile, then color matching between them can occur. When the image is specified by a color profile other than a common "reference" color profile, e.g. other than the sRGB color profile, then the application at the server can convert the image to the common color profile used by the graphical elements to ensure that when viewed together at the client device, the graphical elements and images can be color matched.

Conversion of images between color profiles can change the RGB values for the images. Rather than change the stored version of the image at the server, the original image and its attached color profile can be retained, while the converted image and common reference color profile can be transmitted to the client device for display. Untagged images in the document can also be tagged with the common color profile; generally the sRGB profile can be used as a "default" standard color profile for displaying documents distributed through the internet. Graphical elements can also be tagged (or left untagged) prior to transmission. Standardizing the display of a document to a common color profile, such as the sRGB profile, can improve color consistency when displaying the documents on a variety of computing devices.

FIG. 1 illustrates a network 100 of computing devices that can generate, process, exchange and display documents through an internet connection. Representative computing devices include a computer 102, a tablet 106, a smartphone 108 and a laptop computer 110. Each of the computing devices illustrated can include an integrated and/or connected display on which documents can be reproduced, and the displays can vary in size, resolution, color reproduction and other key features. One of the computing devices, e.g. the computer 102, can generate a source document 114 that can be processed on the computer 102 and can be displayed on an integrated display of the computer 102 and also on a connected secondary display 104. The main display of the computer 102 and the connected secondary display 104 can each have different display characteristics, and the operating system of the computer 102 can process images to display the source document 114 properly on each display. The source document 114 can include a combination of images and graphical elements that can each specify colors using a set of RGB values. Images can include an international color consortium (ICC) color profile that specifies how the RGB values can be interpreted according to international standards for color reproduction. The operating system of the computer 102 can include color management software that processes the document for display including accounting for color profiles to reproduce the document accurately on the integrated and attached displays.

The source document 114 can be uploaded from the computer 102 to a network server 112 and downloaded from the network server 112 to another computing device across a (World Wide Web) internet connection. At the network server 112, the stored remote document 116 can correspond exactly to the source document 114 or can be a variant of the source document 114 that includes changes added by an application at the network server 112. In a representative embodiment, the source document 114 can be processed by an application at the network server 112 to create the remote document 116. For example, a user of the computer 102 can initially create the source document 114, upload the source document 114 to the network server 112 and then manipulate the source document 114 at the network server 112 through a "web based" application thereby creating a new remote document 116.

Any of the computing devices shown in FIG. 1 can download the remote document 116 from the network server 112. Each of the computing devices can include a different set of hardware and software, e.g. operating system, display technology and viewing application. The display on the computing device that views the remote document 116 can differ from the display on the originating computer 102. Without color management, images and graphical elements in the remote document 116 displayed on one of the computing devices, e.g. the tablet 106, can differ in appearance from the same images and graphical elements displayed on the originating computer 102. An image and a graphical element in the remote document 116 that can be color matched to each other when displayed at the computer 102 can be color mismatched when appearing on the tablet 106. To provide consistent appearance of images and graphical elements of documents when displayed on different computing devices, an application at the network server 112 can "convert" select elements of the remote document 116 before transmitting a "retrieved" modified document 118 to display on the computing devices.

In some embodiments, the application at the network server 112 can be aware of color management processing characteristics of an application and/or operating system and/or display capabilities used at the computing device on which the retrieved document is displayed. The network server 112 can account for these color management characteristics when converting the remote document 116 for display on a target computing device that receives the retrieved document 118.

Figure 2:
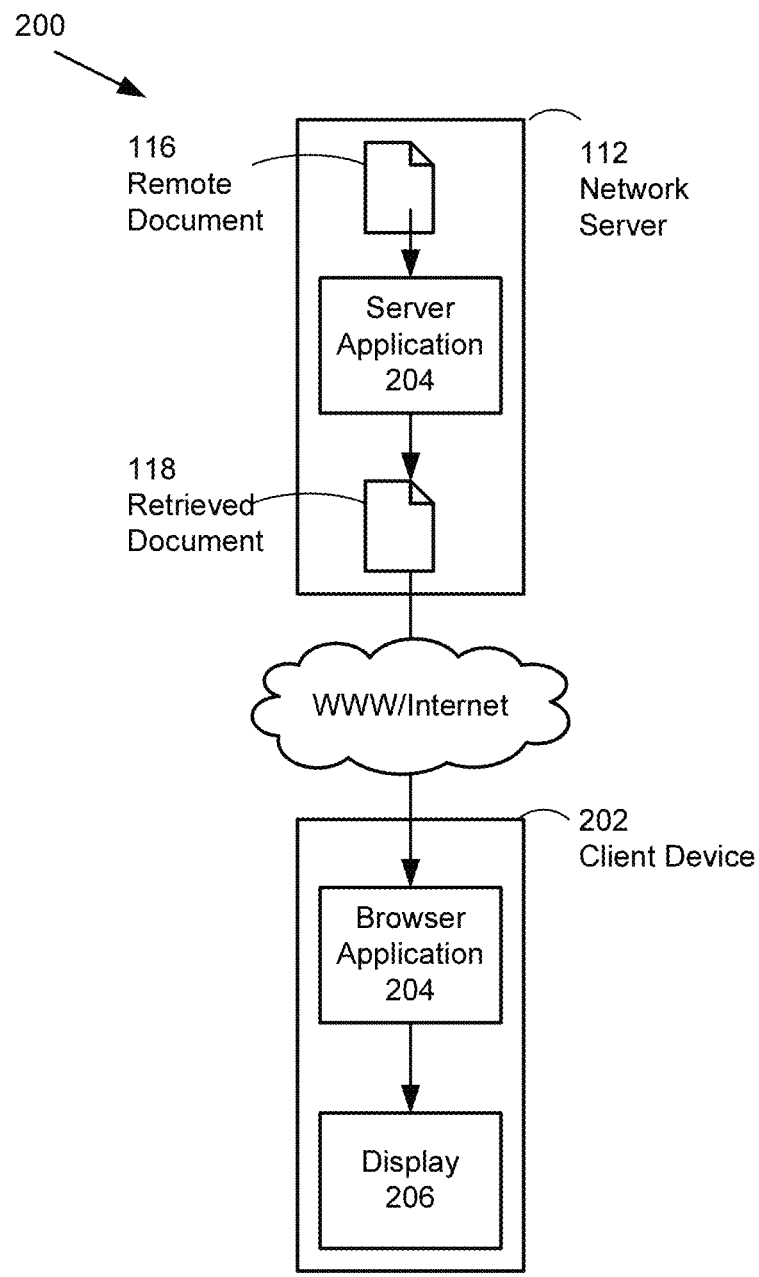
FIG. 2 illustrates retrieval of a document from the network server by a client device through a browser application.

FIG. 2 illustrates processing 200 for a document by the network server 112 when retrieved for display by a client device 202. The remote document 116 stored in the "cloud" network can be accessed by the network server 112. A server application 204 in the network server 112 can convert one or more elements in the remote document 116 to generate the retrieved document 118 by modifying the remote document 116. The retrieved document 118 can be transmitted through the internet to the client device 202. A browser application 204 resident in the client device 202 can be used to view the retrieved document 118 on a display 206 integrated with and/or connected to the client device 202. Different browser applications 204 can offer different levels of color management for elements in the retrieved document when presented on the display 206. Some browser applications 204 can use no color management, sending elements of the retrieved document 118 directly to the display 206, while other browser applications 204 can account for color profile information associated with elements of the retrieved document 118, thereby "converting" in the browser application 204 RGB values for select elements of the retrieved document 118 before displaying them. Transforming RGB values by an application and/or operating system in the client device 202 can be referred to as "color management".

Figure 3:
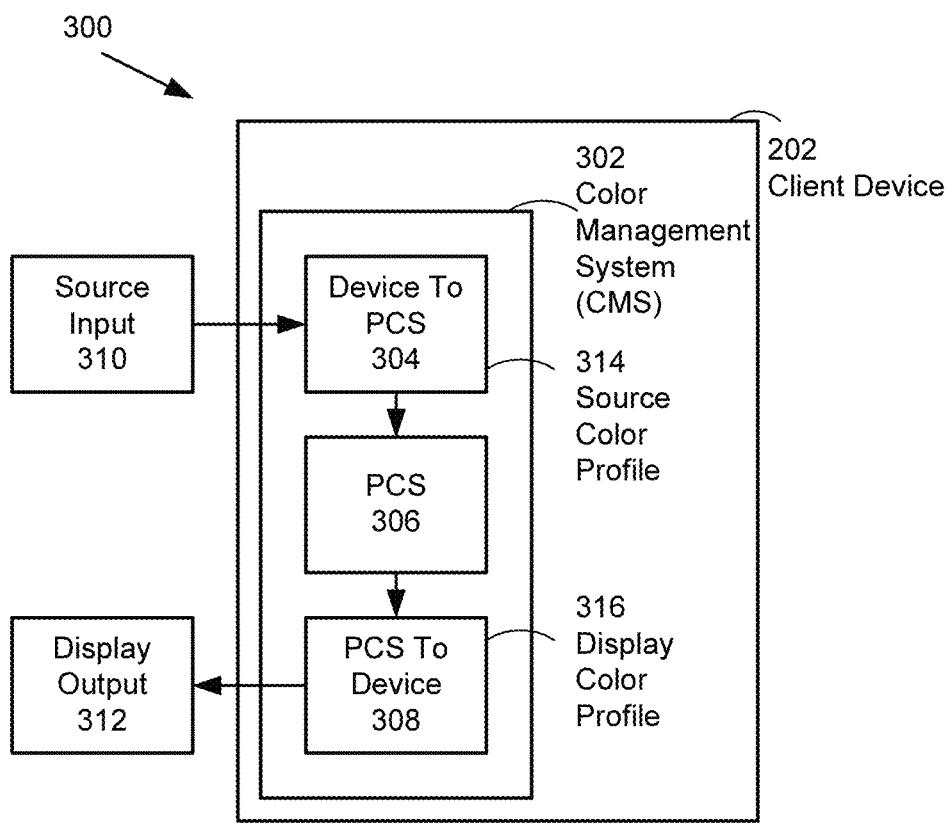
FIG. 3 illustrates color management in a client device.

FIG. 3 illustrates a representative embodiment of color management 300 in the client device 202 using a color management system (CMS) 302. Color management provides conversion of color representations in documents to display on different devices and can seek to provide consistent and/or accurate color appearance when displayed on a diverse array of devices. Representative color management systems 302 include COLORSYNC, a color management application programming interface (API) used in the Apple® OS X operating system, and Windows Color System (WCS) used in the Microsoft® Windows operating system. As shown in FIG. 3, a source input 310 can be processed by the color management system 302 based on a source color profile 314. RGB values in the source input 310 can be transformed from a device specific representation to a device independent representation through a "Device to Profile Connection Space (PCS)" 304 conversion. The source color profile 314 can indicate how colors in the source input 310 can be transformed to color information in the device independent color space. Representative device independent color spaces include the CIELAB and CIEXYZ representations. Color values from the device independent PCS 306 can be transformed to RGB values of a display output 312 through a "PCS to Device" 308 conversion based on a display color profile 316. For a calibrated display on which the display output 312 can be shown, the display color profile 316 can be created through a characterization known as color profiling measuring the display's colors. Most displays are not calibrated in situ, however, and instead the display can be manufactured (and tested at a factory) to conform to a common reference color space, e.g. sRGB. Most displays supplied with computing devices have been standardized to the sRGB color profile, although some displays are manufactured to a "wider gamut" color profile that can display more colors than a standard sRGB display.

Figure 4:
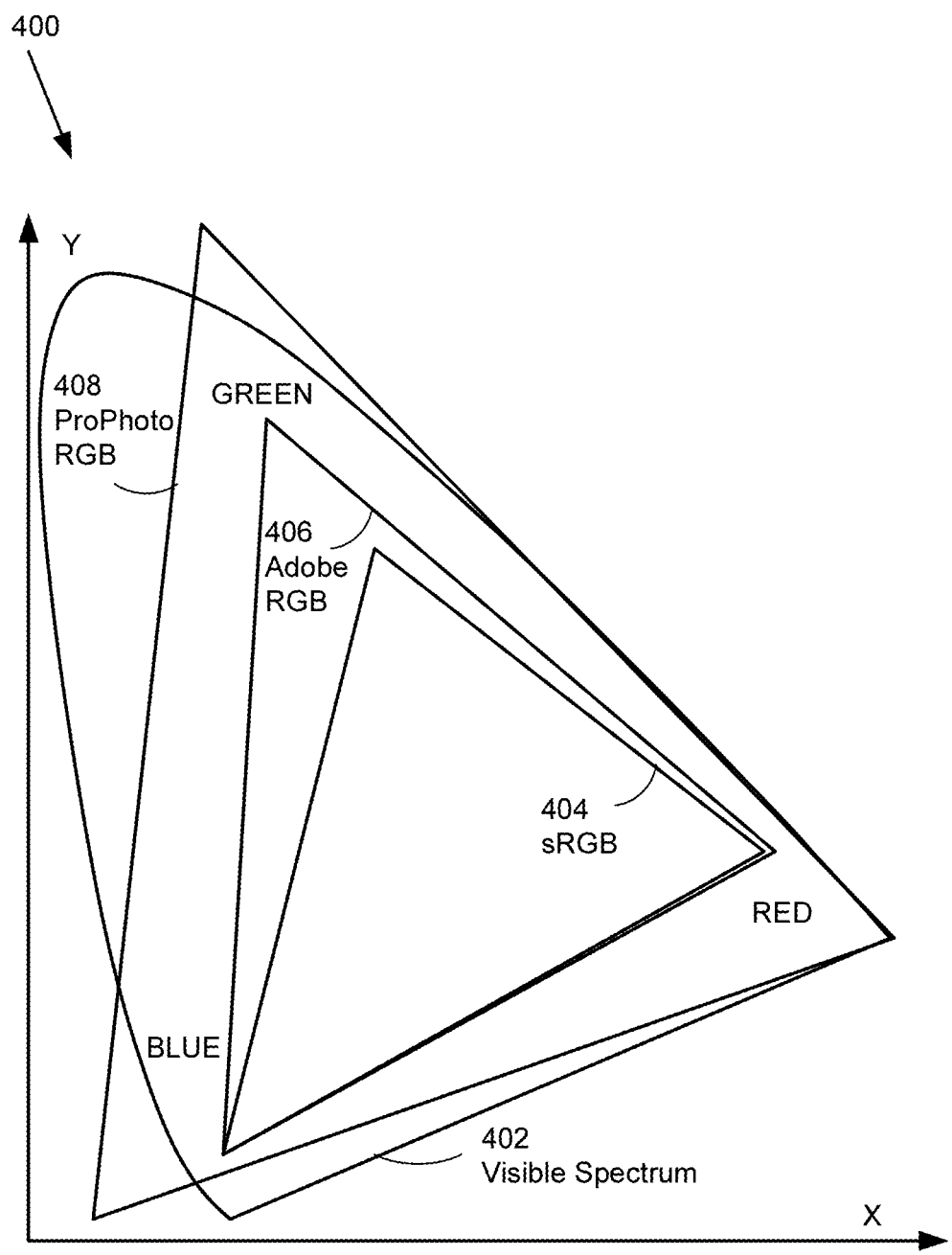
FIG. 4 illustrates several color spaces based on standardized color profiles relative to a visible spectrum.

Standard color profiles can specify color spaces that define representations for RGB color values relative to an absolute color reference. FIG. 4 illustrates on a single diagram 400 two-dimensional representations for several different standard color profiles. Each color profile is shown relative to a visible spectrum 402 of colors that can be perceived by an average person and plotted according to the standardized CIE 1931 XYZ color space created by the International Commission on Illumination (CIE). Colors in the visible spectrum 402 range from a shortest wavelength (highest frequency) at the "violet" end of the color spectrum to a longest wavelength (lowest frequency) at the "red" end of the color spectrum. Colors of light outside the visible spectrum 402 can include "ultra-violet" (UV) light values and "infra-red" (IR) light values. Within a computer system, color values are represented typically as a triple of red, green and blue (RGB) values having eight or more bits for each value. Each RGB color space defined by a color profile can be illustrated as a triangle of RGB values as shown in the diagram 400, with the lower left triangle vertex representing a pure blue (0,0,X) color value, the lower right triangle vertex representing a pure red (X,0,0) color value, and the upper triangle vertex representing a pure green (0,X,0) color value. An RGB color value having equal amounts of red green and blue (X,X,X) can represent a neutral color from black to grey to white depending on light intensity (0,0,0) corresponding to black and (max, max, max) corresponding to white. As shown in FIG. 4, the sRGB color space 404 covers a smaller portion of the visible spectrum 402 than the Adobe RGB color space 406. A particular RGB value (r,g,b) can be associated with a different absolute color in the different color spaces represented by the different color profiles. For example, the pure green color (0,X,0) at the upper vertex of the sRGB color space 404 corresponds to a different absolute color in the visible spectrum 402 than the same RGB value at the upper vertex of the Adobe RGB color space 406. The ProPhoto RGB color space 408 can represent a much wider array of colors than the sRGB color space 404 and the Adobe RGB color space 406, including some colors that fall outside of the visible spectrum. When an image in a document is defined by a color profile that encompasses a different set of colors from the color profile associated with the output display, the RGB values of the image can be transformed using the color management system, including mapping "out of gamut" colors in one color space into "in gamut" colors in the other color space. If the application and/or operating system in the computing device that displays the image does not use color management, then significant visible color shifts can occur, and the resulting image displayed without color management can differ from an intended color representation.

Figure 5:
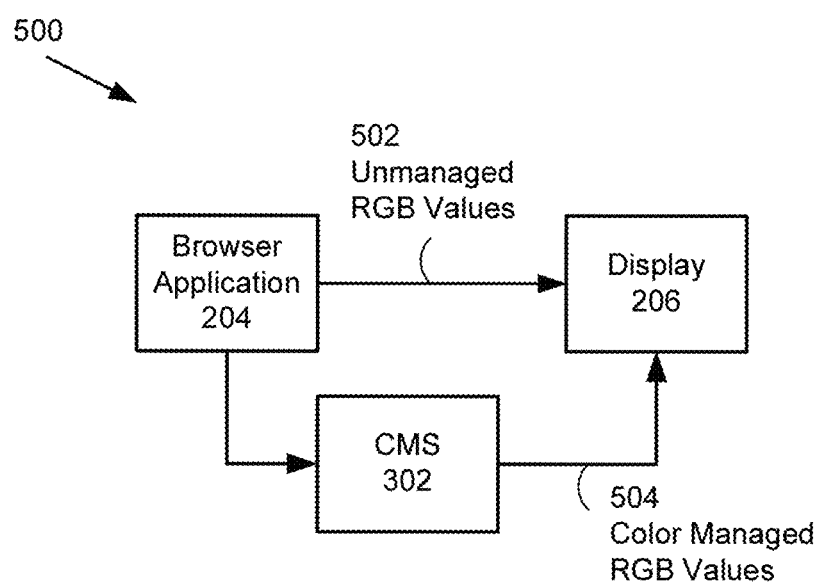
FIG. 5 illustrates a combination of managed and unmanaged color values in a client device.

FIG. 5 illustrates a configuration 500 for color management in the client device 202 in which the browser application 204 applies different color management to different portions of a document. The browser application 204 can send some RGB color values of the document to be displayed through the color management system 302 before presenting "color managed" RGB values 504 on the display 206. Other "unmanaged" RGB values 502 in the document can be sent directly to the display 206 without processing through the color management system 302. For example, an image in the document can be color managed, while a graphical element in the document can be not color managed. The same RGB value in an image and in a graphical element of a document can display differently by the browser application 204 based on the different application of color management used for different elements of the document. The same RGB value in an image that is "color managed" and in a graphical element "that is not color managed" can map to same color, however, when the "color managed" image uses an embedded color profile that corresponds to a display color profile used by the display 206. In this instance, the transformation from the image color space to PCS to display color space will result in the color managed RGB values 504 being identical to the unmanaged RGB values 502, as the image and display color profiles are identical. In some cases, the display color profile can be the same as (or very close to) a common reference color profile. If the color profile associated with images (or more generally any color managed elements) in the document is a common color profile used as a display color profile, then equal RGB values in the image and graphical elements can match when presented on the display 206. In a representative embodiment, the display profile can be a standard sRGB color profile, and both images and graphical elements in the document can be associated with and/or interpreted according to the sRGB profile. In this case, the unmanaged RGB color values 502 can be matched to the color management RGB values 504 when presented on the display 206 without requiring color management for all elements.

Figure 6:
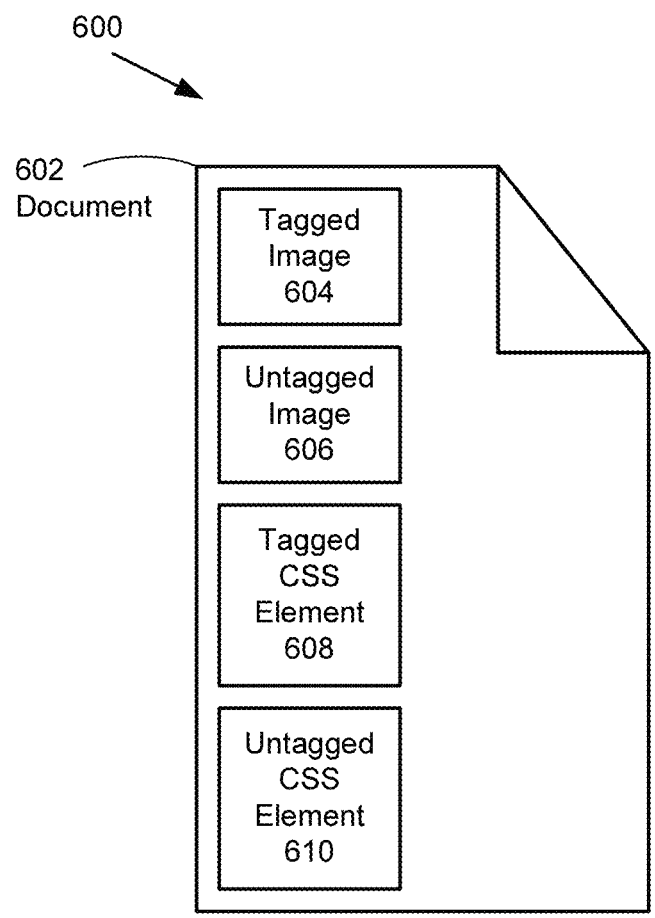
FIG. 6 illustrates several elements of a document that can be color managed.

FIG. 6 illustrates representative elements 600 that can be included in a document 602 that can be generated, stored, processed, retrieved and displayed by computing devices using color management. The document 602 includes four different elements, a tagged image 604, an untagged image 606, a tagged CSS element 608 and an untagged CSS element 610. The tagged image 604 can include an image formatted according to a well known image file type, e.g. JPEG, TIFF, PNG and PDF, and also includes an embedded color profile associated with the tagged image 604 that specifies how the color values in the tagged image 604 can be interpreted. With color management, the tagged image 604 can be displayed consistently and accurately on different displays that have different color display properties. Without color management, the color profile associated with the tagged image 604 can be ignored, and the tagged image 604 can display differently on different computing devices. The untagged image 606 can include an image file type without an accompanying embedded color profile. While image file types can include a color profile, they are not required to do so. As untagged images 606 do not specify the color space for the color values in the untagged image 606, the RGB color values can display differently on different computing devices depending on how untagged images 606 are processed by each individual computing device and also on properties of the display on which the untagged image 606 is displayed. As with images 604/606 in the document, graphical elements 608/610 can be tagged or untagged as well. The tagged graphical element 608 can be specified as an RGB value according to a cascading style sheet (CSS) along with an associated color profile. Alternatively, the untagged graphical element 610 can specify RGB values according to a CSS without an accompanying color profile. The untagged CSS graphical element 610 can be interpreted according to a common "reference" color profile, e.g. using a standardized sRGB profile when color management is applied for the untagged CSS element 610. Without color management, however, the untagged CSS graphical element 610 can be reproduced directly on the display without adjustments to the RGB color values and therefore can the resulting colors can vary based on different color properties of the display on which the untagged CSS graphical element 610 is presented. FIGS. 7-11 present several different color management scenarios for processing and displaying the different elements 604/606/608/610 of the document 602.

Figure 7:
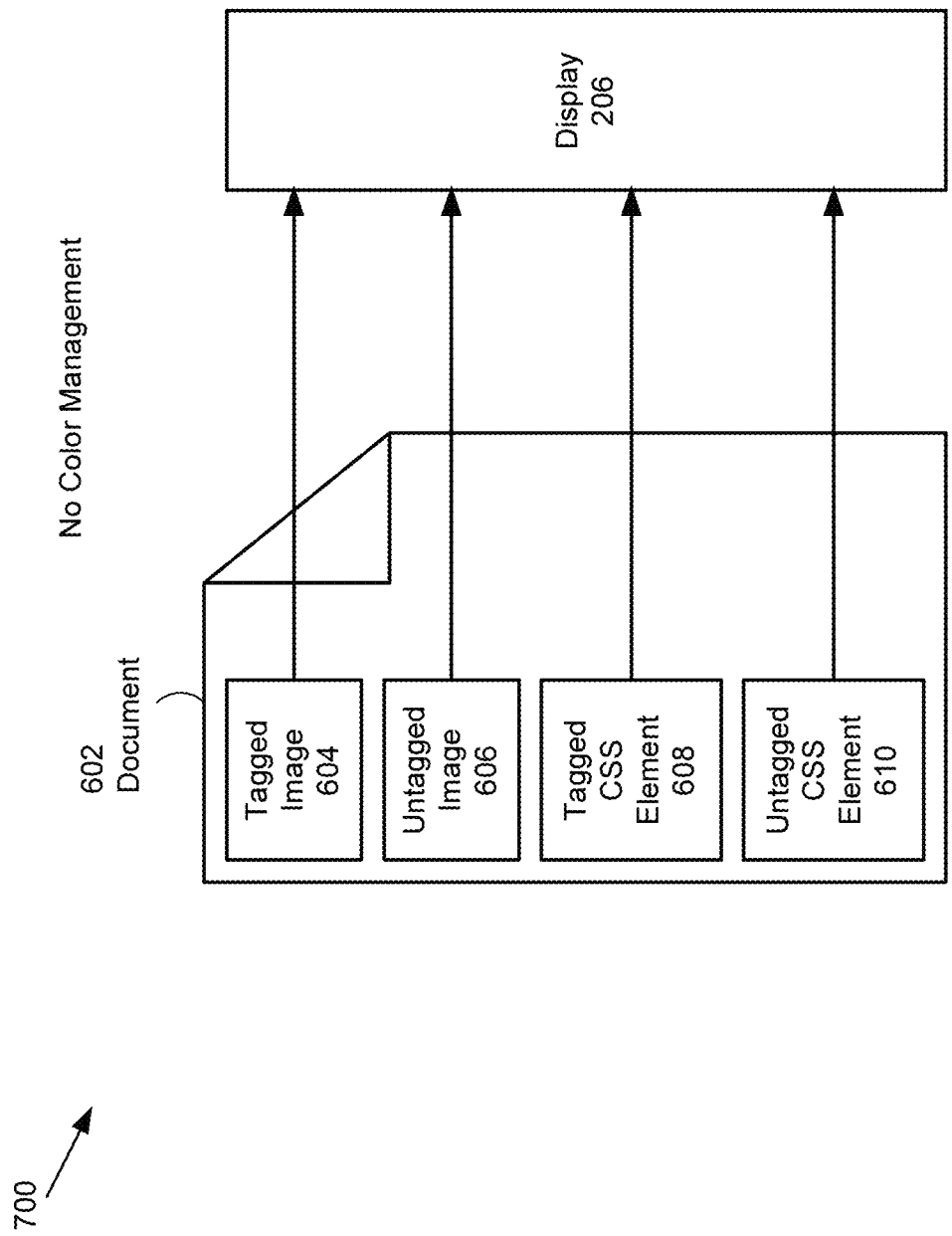
FIGS. 7-11 illustrate different combinations of color management in a client device for the elements of the document of FIG. 6.

FIG. 7 illustrates a color management scenario 700 in which no color management is performed on the elements 604/606/608/610 of the document 602. All of the elements 604/606/608/610, whether tagged with color profiles or untagged, are sent directly to the display 206 without any changes in RGB values to account for the source color space in which the images 604/606 and/or CSS graphical elements 608/610 were specified. The same RGB value in each of the images 604/606 and graphical elements 608/610 will display identically on the display 206. The intended color representation for the RGB value in the tagged image 604 and/or tagged CSS graphical element 608, however, can not necessarily be realized when no color management is used, as the color characteristics of the display can differ from the color profile associated with the tagged image 604 and/or the tagged CSS graphical element 608.

Figure 8:
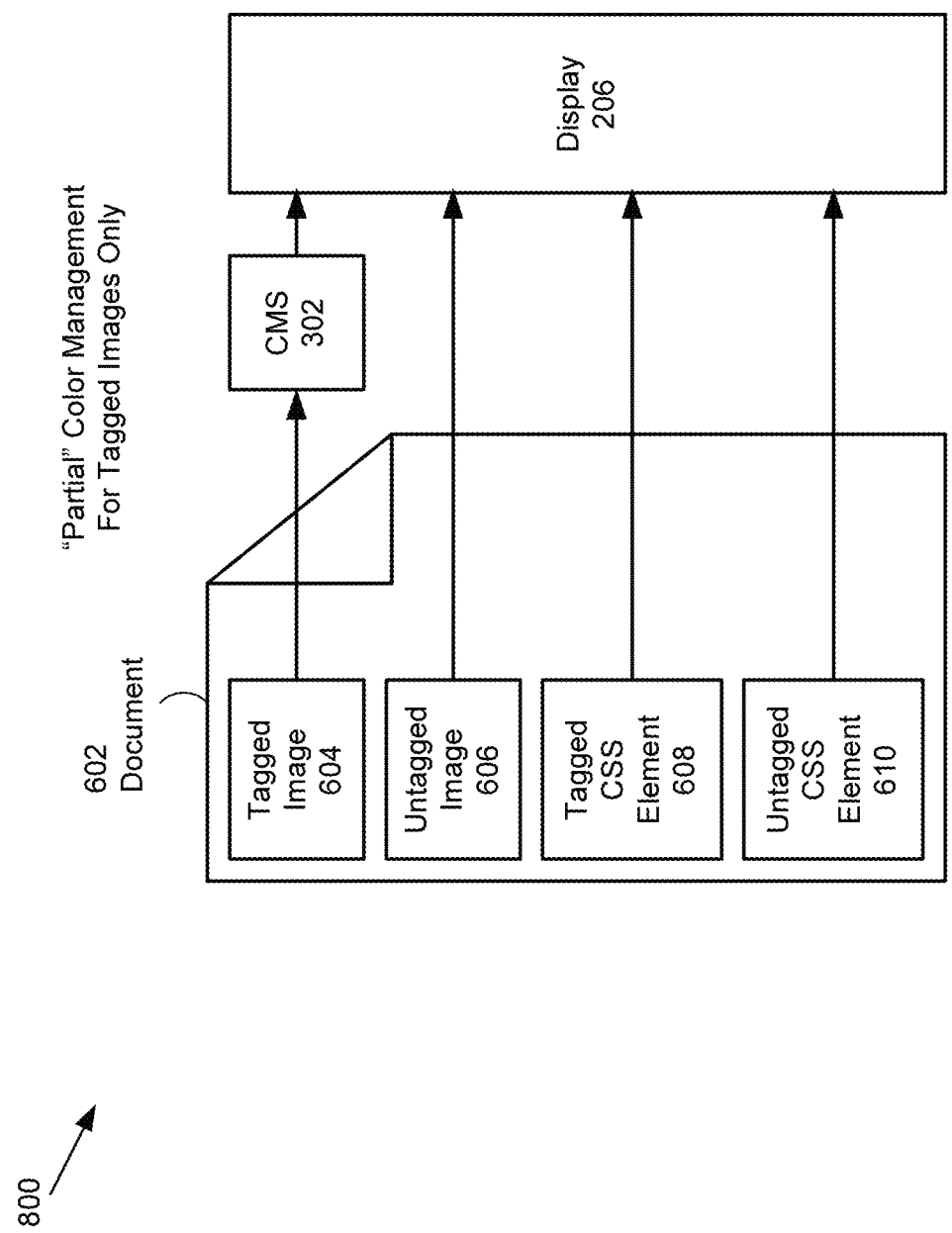

FIG. 8 illustrates a scenario 800 in which "partial" color management is applied to tagged images 604 only in the document 602. The other elements 606/608/610 in the document are displayed without color management. The tagged image 604 can be processed through the color management system 302 before being presented on the display 206. By processing the tagged image 604 according to its accompanying color profile 604, the CMS 302 in the client device 202 can adjust the RGB color values to be presented on the display 206 as close as possible to the original intent. As the tagged CSS graphical element 608 is displayed without color management through the CMS 302, equal RGB values in the tagged image 604 and in the tagged CSS element 608 can display differently on the display 206.

Figure 9:
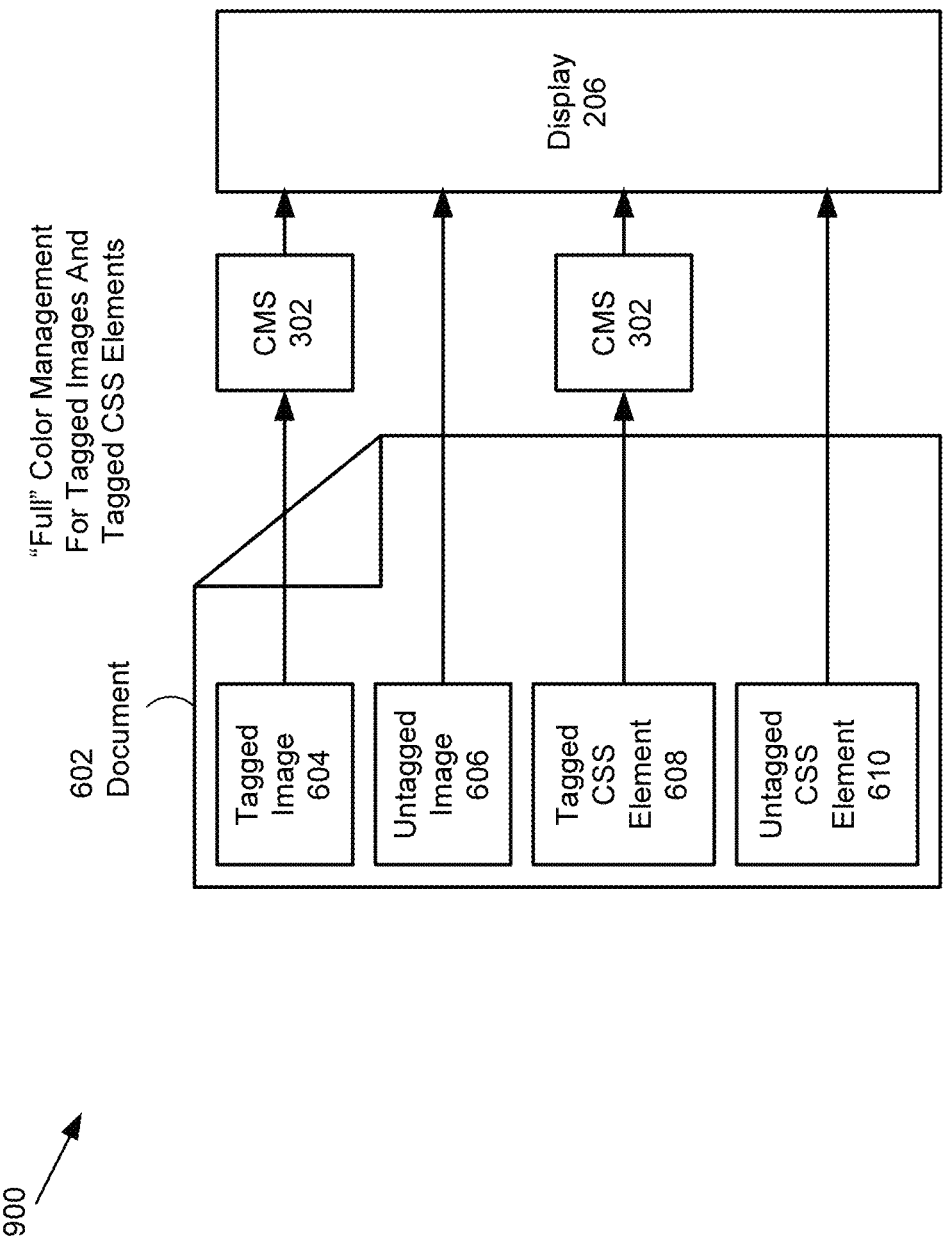

FIG. 9 illustrates a scenario 900 in which "full" color management is applied to tagged images 604 and tagged CSS graphical elements 608 in the document 602, while untagged images 606 and untagged CSS graphical elements 610 are not processed through the color management system 302. When both the tagged image 604 and the tagged CSS graphical element 608 are associated with the same color profile, equal RGB values in the tagged image 604 and the tagged CSS graphical element 608 can display consistently and accurately as the identical, intended colors on the display 206 when processed through the CMS 302. When the color properties of the display 206 is sufficiently close to the color profile for the tagged images 604 and tagged CSS graphical elements 608, then RBG values in the untagged image 606 and untagged CSS graphical element 610 can also match to RGB values in the tagged image 604 and tagged CSS graphical element 608.

Figure 10:
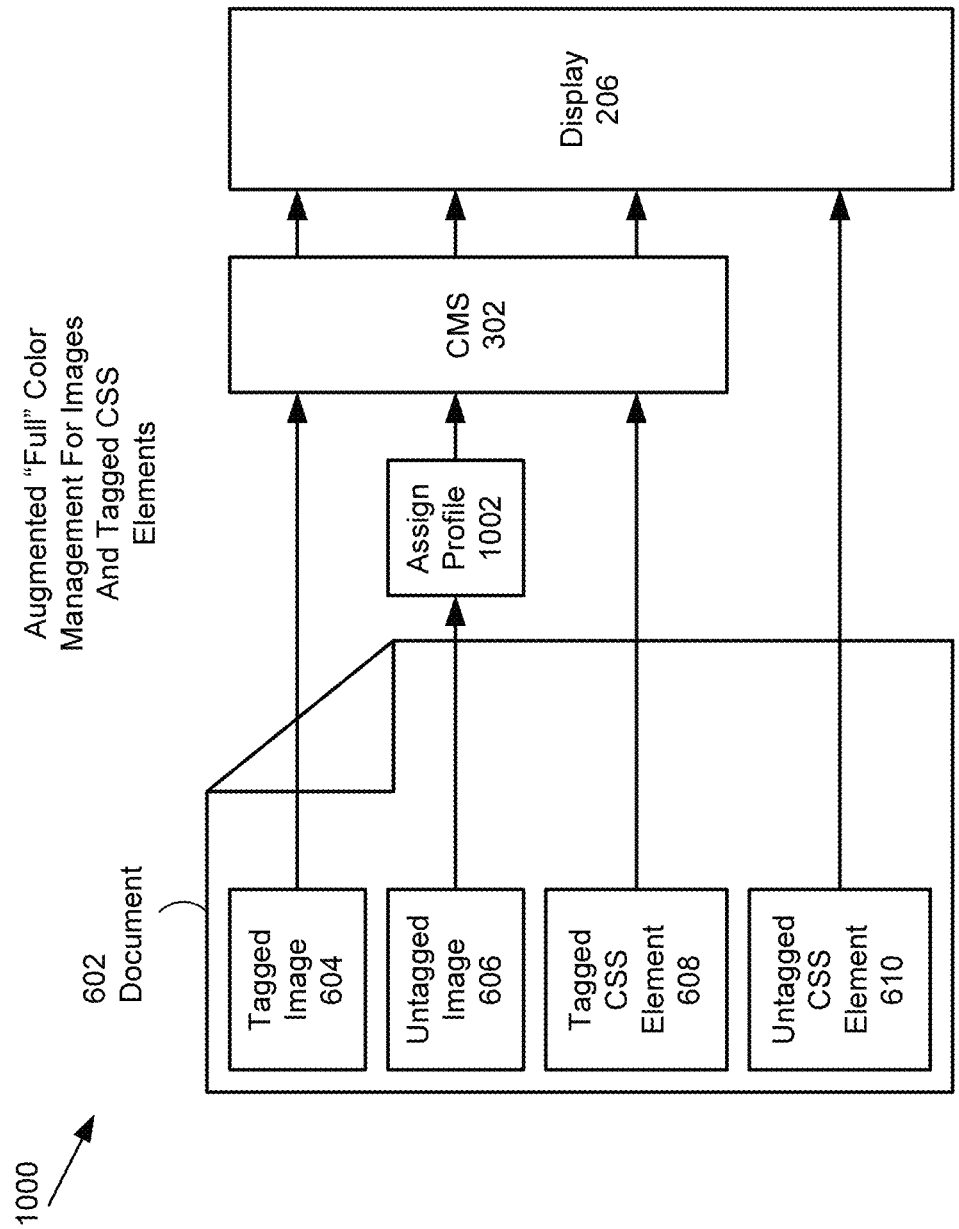

FIG. 10 illustrates a scenario 1000 in which the "full" color management of FIG. 9 is augmented by tagging untagged images 606 with a color profile. In the "augmented" scenario, a color profile is assigned 1002 to the untagged image 606 before processing all "tagged" images and CSS graphical elements through the color management system 302 and presenting on the display 206. The color profile assigned to the untagged image 606 can be a common "reference" color profile, such as the sRGB color profile that is a de facto standard color profile for images presented through the internet. By tagging the untagged image 606, the color representation on the display of the untagged image 606 can in some instances more accurately display the intended color than when sent directly to the display, especially when the color properties of the display differ substantially from a common color profile, e.g. a wide gamut display. Untagged images presented on a wide gamut color display without color management can appear substantially differently than when adjusted appropriately by the color management system 302.

Figure 11:
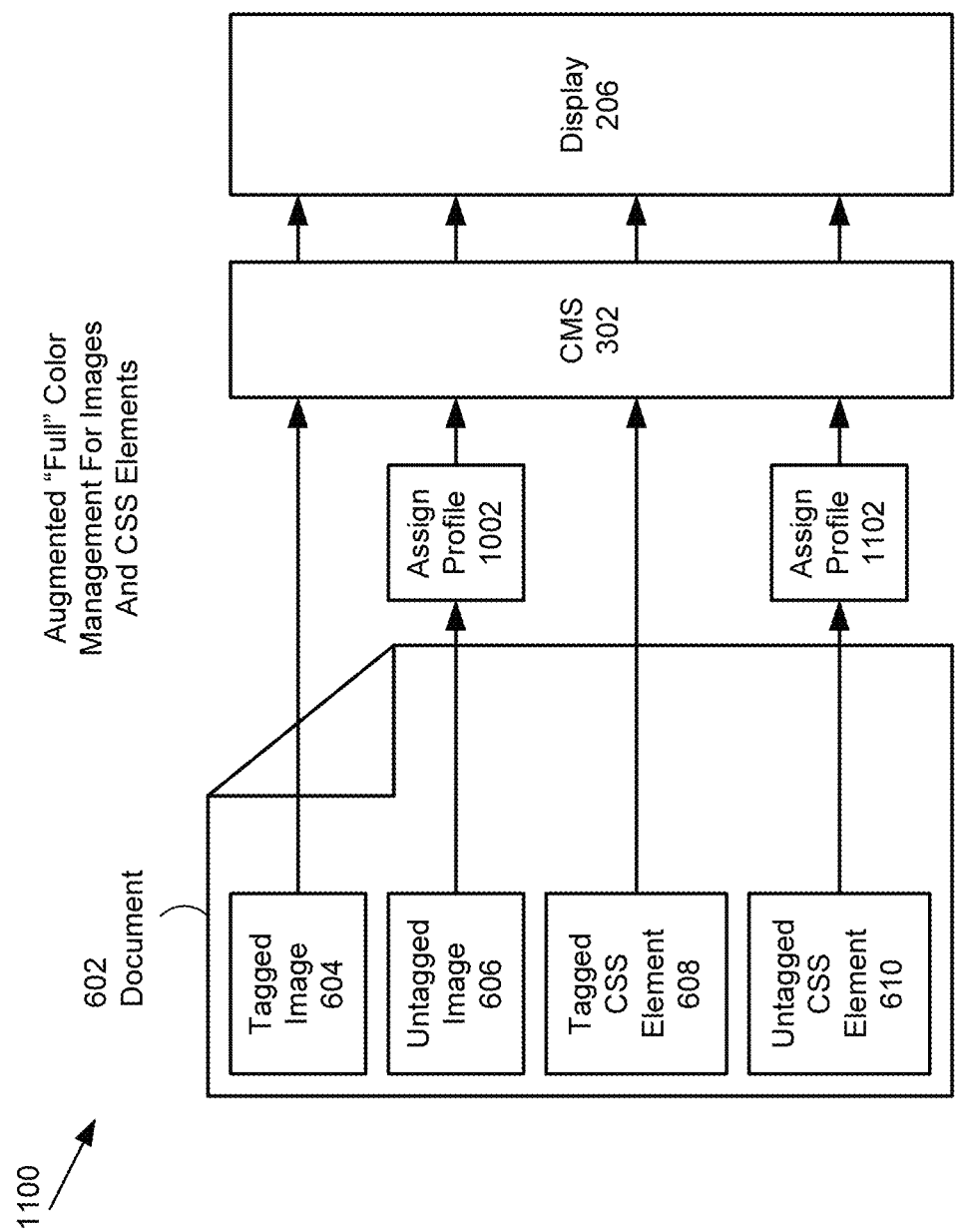

FIG. 11 illustrates a scenario 1100 in which the "full" color management of FIG. 9 is augmented to include adding color profiles to both untagged images 606 and untagged CSS graphical elements 610 in the document 602. As in FIG. 10, the untagged image 606 can be assigned 1002 a color profile before processing by the color management system 302. The untagged CSS graphical element 610 can also be assigned 1102 a color profile and then be processed by the color management system 302 for presentation on the display 206. Typically the same color profile can be assigned to both untagged images 606 and untagged CSS graphical elements 610.

Figure 12:
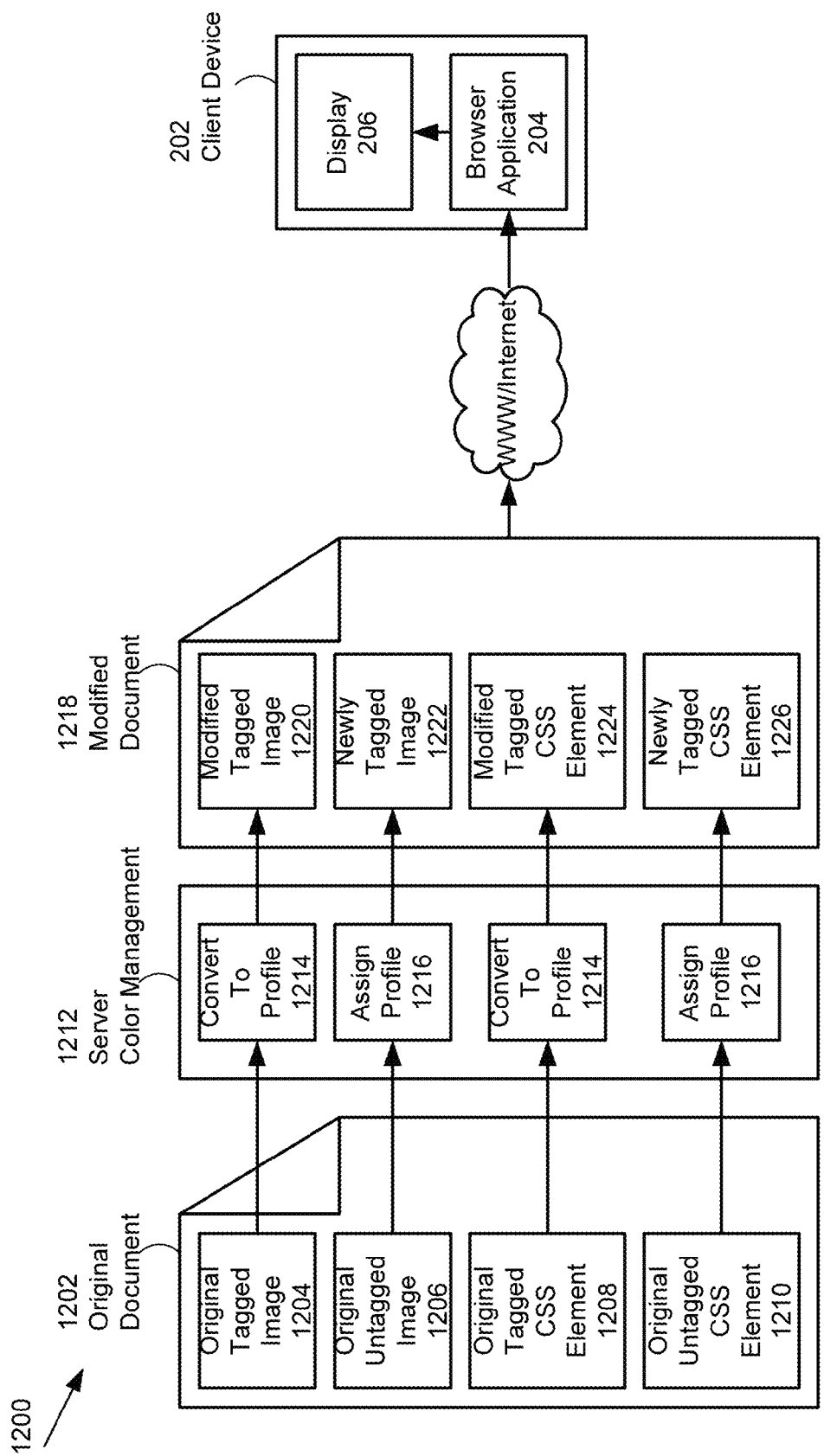
FIG. 12 illustrates color management at a server for the elements of the document of FIG. 6.

FIG. 12 illustrates a color management scheme 1200 in which color conversion can be applied at a server to select elements of an original document 1202 before transferring a modified document 1218 through the internet to a client device 202 to display through the browser application 204 on the display 206. The original document 1202 at the server can include an original tagged image 1204 that is tagged with a color profile. Color management 1212 at the server can convert 1214 the color RGB values in the original tagged image 1204 from values based on the associated color profile to a different target color profile resulting in a modified tagged image 1220 with changed color RGB values. The target color profile can be a common color profile. In an embodiment, the common color profile can be a standardized color profile, such as the sRGB profile. In another embodiment, the common color profile can be a specific color profile provided by the client device 202, e.g. a display color profile for the display 206 on which the modified document 1218 can be displayed. In another embodiment, the common color profile can be a color profile specified dynamically by a user of the client device 202 when downloading the document 1202/1218 for viewing through the browser application 204 on the client device 202. In addition to converting the original tagged image 1204, an original tagged CSS graphical element 1208 associated with its own color profile can be converted 1214 to a modified tagged CSS graphical element 1224 associated with the same target color profile as the modified tagged image 1220. After conversion of the original tagged images 1204 and the original tagged CSS elements 1208 in the original document 1202, tagged elements in the modified document 1218 can use the same common color profile. In addition to conversion of tagged elements in the original document 1202, the server color management 1212 can also assign 1216 a target color profile to original untagged images 1206 and original untagged CSS graphical elements 1210. The newly tagged images 1222 and newly tagged CSS graphical elements 1226 can be assigned the same target color profile as the modified tagged elements 1220/1224 in the modified document 1218. The modified document 1218 can be transmitted through the internet to the client device 202 to be displayed through a browser application 204.

Conversion of original tagged images 1204 and original tagged CSS graphical elements 1208 can provide a modified document 1218 that uses a common color profile for all tagged elements. Untagged images 1206 and untagged CSS graphical elements 1210 can also be tagged with the same common color profile. With a single common color profile for the modified document 1218, variations in color representation through the browser application can be minimized. As different browser applications 204 can use different color management schemes, the selection of a common color profile that is standardized and capable of being displayed on the vast majority of displays for various computing devices can prove beneficial. In an embodiment, the common color profile can be the sRGB profile to which most computing device displays can conform.

Table 1300 in FIG. 13 illustrates several different transformations of RGB color values that can occur for different combinations of color management and color profiles. In the first transformation 1302, when no color management is used, color profiles associated with an element in a document are ignored. In this case, the source color profile associated with the source RGB color value and the display color profile associated with the display RGB color value are not applicable (N/A). Without color management, the source RGB color value (Rs1, Gs1, Bs1) can be presented on the display unchanged as the display RGB color value (Rs1, Gs1, Bs1). As the original source color profile (if it exists) is ignored, the intended "absolute" color value cannot be determined, and the displayed RGB color value can vary based on the display 206 on which it is presented by the client device 202. Neither accurate nor consistent color can be achieved without color management. In the second transformation 1304 and the third transformation 1306, color management is used to convert the source RGB color value (Rs1, Gs1, Bs1) according to the sRGB color profile to an absolute PCS CIEXYZ color value (x1,y1,z1). The absolute color value (x1, y1, z1) can then be converted according to the appropriate display color profile to produce a displayed RGB color value that matches to the intended color value (as well as possible accounting for variations and color gamuts of different color displays). In the second transformation 1304, the display color profile is the sRGB color profile, and the display RGB color values (Rs1, Gs1, Bs1) are the same as the source RGB color values. In the third transformation 1306, however, the display color profile is a device specific color profile (labeled "Device RGB"), and the resulting display RGB values are (Rd1, Gd1, Bd1) that can differ in numerical value from the source RGB color values (Rs1, Gs2, Bs2). Even though the display RGB values for the two transformations 1304 and 1306 are different, the displayed color is intended to be the same, i.e. as close as possible to the absolute color value (x1, y1, z1). Color management with the second and third transformations 1304/1306 illustrate that the same source RGB color value can be adjusted to produce the same intended color across different displays.

In the fourth transformation 1308, a source RGB value (Rs2, Gs2, Bs2) is associated with an Adobe RGB source color profile and is mapped to the same absolute color value (x1, y1, z1) as the second and third transformations 1304/1306. With an sRGB display color profile, the resulting display RGB color values (Rs1, Gs1, Bs1) from the color management transformation 1308 can match those produced by the color transformation 1304, even though the source color RGB values are different. Color management accounts for the different source color spaces in which the source RGB values are defined. Without color management, the source RGB color value (Rs2, Gs2, Bs2) would be sent to the display unchanged as the display RGB values (Rs2, Gs2, Bs2). Unless the display color profile exactly matched the source color profile (i.e. the Adobe RGB profile), the resulting colors would differ from the intended color values. In order to compensate for inadequate color management at the client device 202, the source RGB color values can be converted at the server 112 to a common color profile, e.g. sRGB. Thus the "Adobe RGB" source RGB color values (Rs2, Gs2, Bs2) can be converted to the "sRGB" source RGB color values (Rs1, Gs1, Bs1) before transmission to the client device 202. If there is color management at the client device 202, the color values can be reproduced as accurately as possible within the more limited sRGB color space (compared against the larger Adobe RGB color space). The conversion from the Adobe RGB color space to the sRGB color space at the server 112 can affect "in gamut" colors minimally and "out of gamut" colors can be mapped using a defined intent (e.g. perceptual intent) to minimize differences when displayed. For the case when there is no color management at the client device 202, the color values can also be reproduced accurately and consistently when the display 206 at the client device 202 conforms to the sRGB color profile, as the server performs the appropriate conversion to the common sRGB color space to which the display 206 conforms. When the display 206 conforms to the sRGB color profile, the same color value can be displayed using the first, second or fourth transformations 1302/1304/1308, both with and without color management. Without conversion of color values at the server 112, however, the source RGB color values (Rs2, Gs2, Bs2) will display incorrectly as the display RGB color values (Rs2, Gs2, Bs2) as indicated by the sixth transformation 1312 (no color management) rather than as intended and indicated by the fourth transformation 1308.

The fifth transformation 1310 illustrates that the same source RGB color value (Rs1, Gs1, Bs1) can correspond to different absolute color values when associated with different source color profiles. When the source RGB color value (Rs1, Gs1, Bs1) is associated with the sRGB color profile, the absolute color value (x1, y1, z1) is specified. When the source RGB color value (Rs2, Gs2, Bs2) is associated with the Adobe RGB color profile, a different absolute color value (x2, y2, z2) is specified. With color management as provided by the transformation 1310, the source RGB value (Rs1, Gs1, Bs1) results in the display RGB color value (Rd2, Gd2, Bd2) where the display color profile uses the sRGB color profile. Without color management, however, the display RGB color value will correspond to the source RGB color value, i.e. (Rs1, Gs1, Bs1) as indicated by the transformation 1302, and a different color can be displayed accordingly.

Figure 14:
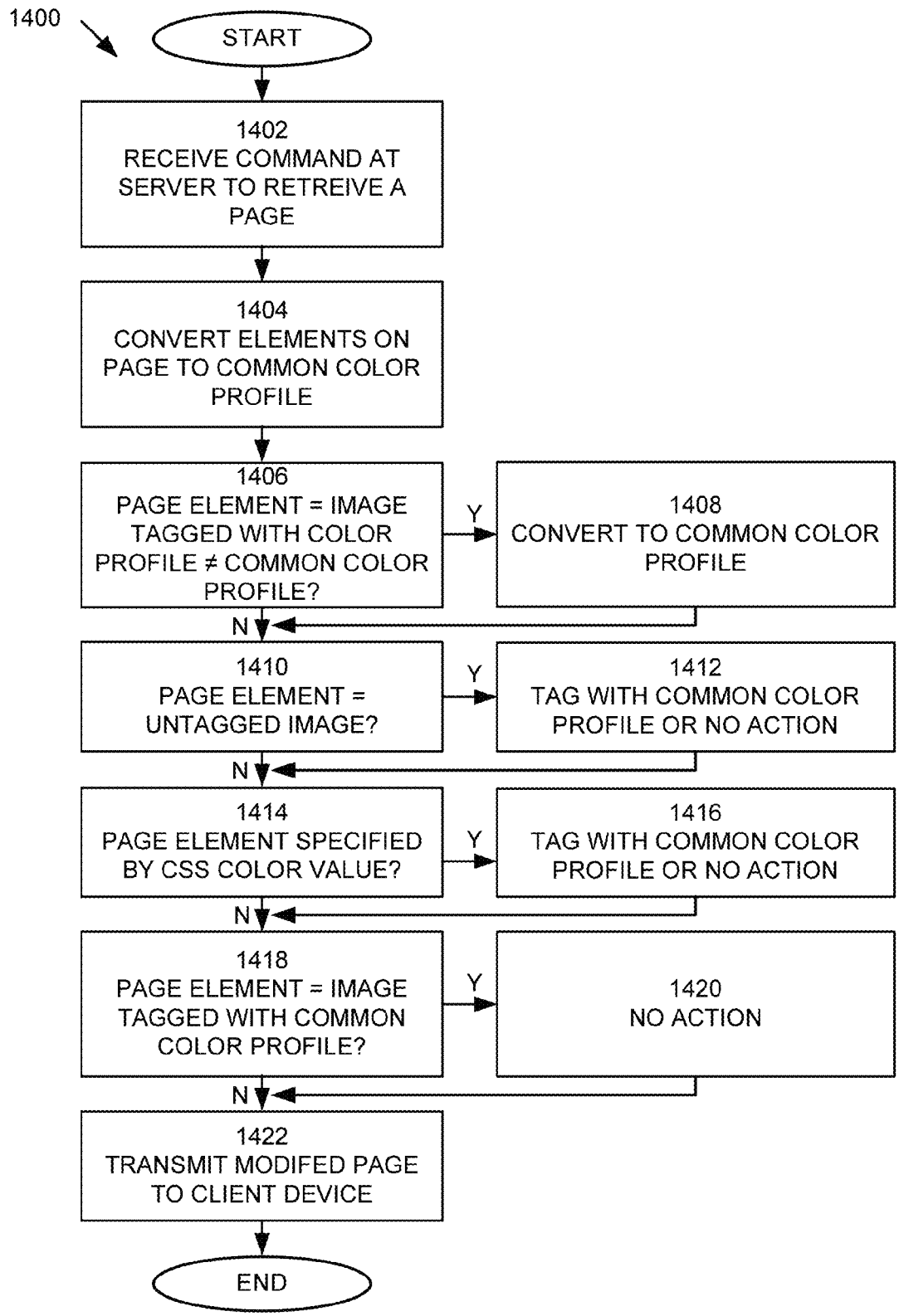
FIG. 14 illustrates a representative method for color management of elements of a document at a server.

FIG. 14 illustrates a representative method 1400 for color management at the network server 112 before transmission of a document/page to the client device 202 for display through the browser application 204 on the display 206 integrated with or connected to the client device 202. In step 1402, the server 112 receives a command from the client device 202 to retrieve a page. (A document or portion thereof can be referred to herein as a page for display through a web browser 204 application at the client device 202.) In step 1404, the server 112 converts at least one element in the retrieved page to a common color profile. In step 1406, the server 112 determines if the page element is an image tagged with a color profile that differs from the common color profile. When the page element (image) is tagged with a color profile different from the common color profile, the server 112 in step 1408 converts the page element (image) to the common color profile. In step 1410, the server 112 determines if the page element is an untagged image. When the page element is an untagged image, in step 1412, the server 112 tags the untagged image with the common color profile or performs no action on the untagged image page element. In step 1414, the server 112 determines if the page element is specified by a cascading style sheet (CSS) color value. When the page element is specified by the CSS color value, in step 1416, the server 112 tags the page element with the common color profile or takes no action. In step 1418, the server 112 determines whether the page element is an image tagged with the common color profile. When the image is tagged with the common color profile, no action is taken as indicated in step 1420. In step 1422, the server 112 transmits a modified page containing the converted page elements to the client device 202. The color management method 1400 illustrated in FIG. 14 provides for several different levels of color management for elements in a retrieved page. Images tagged with color profiles other than a common color profile are converted.

Untagged images and CSS graphical page elements can be optionally tagged with or converted to the same common color profile.

Figure 15:
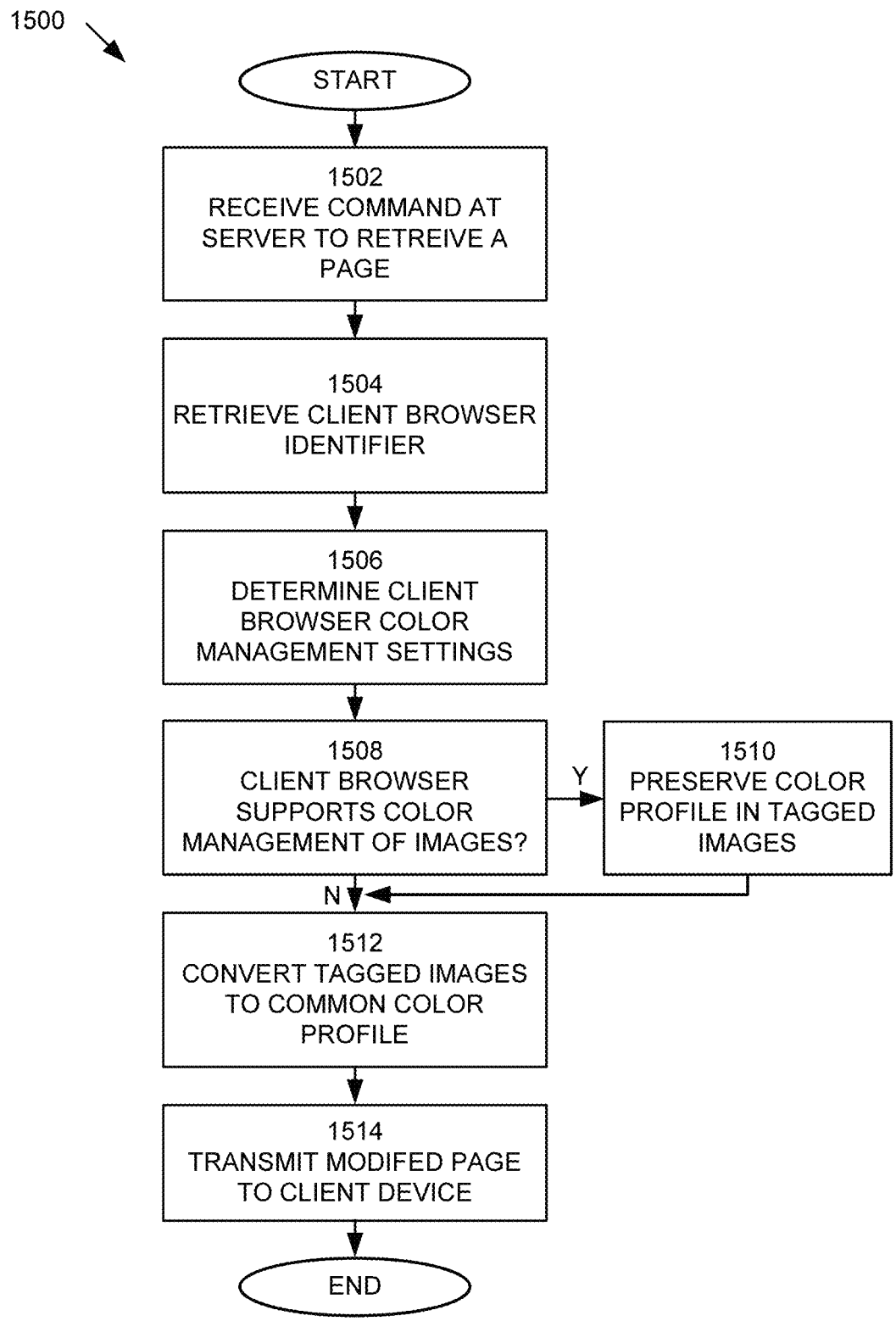
FIG. 15 illustrates another representative method for color management at a server.

FIG. 15 illustrates another representative color management method 1500 executed at the server 112 in response to a command from the client device 202. In step 1502, the server receives a command to retrieve a page. In step 1504, the server 112 retrieves an identifier for a web browser 204 used by the client device 202. In an embodiment, the server 112 receives information about the web browser 204 directly from the client device 202, while in another embodiment, the server 112 retrieves information about the web browser 204 based on the received identifier. In step 1506, the server 112 determines color management capabilities and/or settings for the web browser 204 used by the client device 202. In step 1508, the server 112 determines whether the web browser 204 application at the client device 202 is configured (and/or capable of) supporting color management of images. When the server 112 determines that the web browser 204 at the client device 202 supports color management of images, the server 112, in step 1510, preserves color profiles associated with images tagged with specific color profiles in the retrieved page. When the server 112 determines that the web browser 204 application does not support color management of images, then in step 1512, the server converts the tagged images in the retrieved page to a common color profile before transmitting the modified page to the client device 202 in step 1514. By selectively converting images to the common color profile only when the web browser 204 application does not support color management for the images, the selective conversion at the server 112 can apply equally well to a client device 202 and web browser 204 that uses no color management (which benefits from the conversion to provide a more accurate and consistent display of color) or to a client device 202 and web browser 204 that uses color management of images (which benefits from no conversion to allow the color management to provide accurate and consistent display of color).

Figure 16:
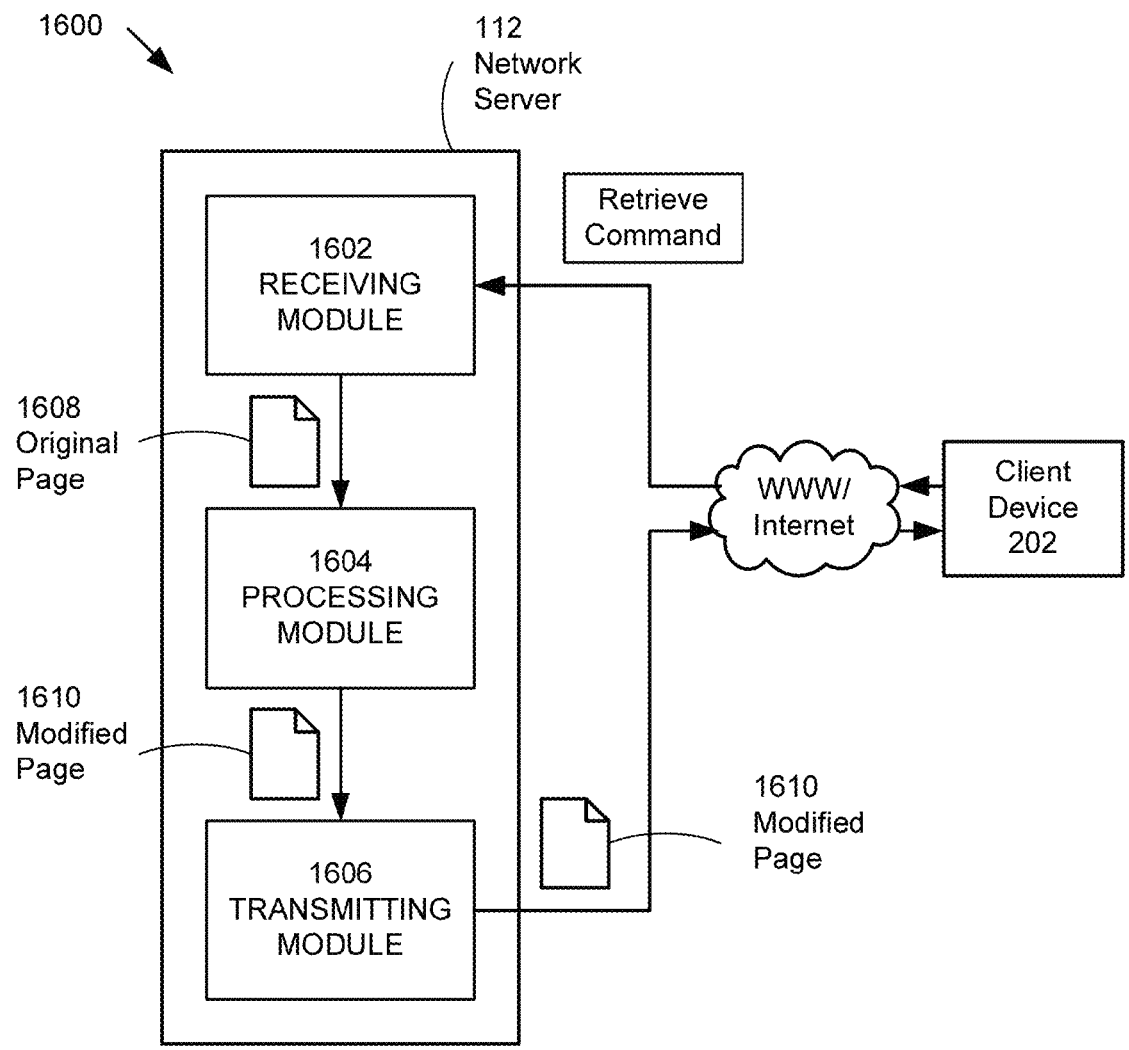
FIG. 16 illustrates select elements of an apparatus for color management in a server.

FIG. 16 illustrates a representative apparatus 1600 to perform color management at a network server 112. A receiving module 1602 in the network server 112 receives a command from the client device 202 transmitted through the internet to retrieve a page. Rather than transmit the page directly, the apparatus 1600 converts select elements in the page before transmission to the client device 202. An original page 1608 is processed by the processing module 1604 to produce a modified page 1610. Elements of the modified page 1610 can differ from the elements in the original page 1608. Select page elements are converted to a common color profile, including at least an image tagged with a color profile and a page element specified by a numerical color value without a color profile. The modified page 1610 is transmitted to the client device 202 by the transmitting module 1606 and presented to the client device 202 for display. In an embodiment, the common color profile to which the image is converted is the standardized ICC sRGB color profile and the numerical color value of the page element is a W3C CSS RGB triple of hexadecimal color values. Untagged images can also be tagged with the common color profile before transmitting the modified page 1610 to the client device 202. In an embodiment, images can be converted to a common color profile based on an indication of the color management capabilities of application software at the client device 202 used to display the retrieved page.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of managing colors for displaying a page at a client device, the method comprising:
   at a server:
   receiving, from the client device, i) a command to retrieve the page
   and ii) an identifier corresponding to a type of web browser on the client device;
   determining, based on the identifier, whether the web browser supports color management of images;
   when the web browser supports color management of images:
   preserving a current color profile of a page element of the page;
   when the web browser does not support color management of images:
   associating a color profile to an untagged page element of the page by converting a color value of the untagged page element of the page according to the color profile, wherein associating the color profile allows for a consistent display of color at the web browser; and
   transmitting the page to the client device.

2. The method of claim 1, wherein the color profile is an International Color Consortium (ICC) sRGB color profile.

3. The method of claim 1, wherein the color value of the page element is a World Wide Web Consortium (W3C) Cascading Style Sheet (CSS) RGB triple of hexadecimal values.

4. The method of claim 1, wherein the page includes a plurality of page elements corresponding to images of the page.

5. The method of claim 1, wherein the untagged page element does not include an accompanying color profile before the converting of the color value of the untagged page element.

6. The method of claim 1, wherein the page element is a cascading style sheet (CSS) graphical element.

7. The method of claim 1, wherein the color value corresponds to a previous color profile associated with the page element.

8. The method of claim 1, wherein the server is configured to transmit both original page elements and modified page elements to the client device.

9. An apparatus for managing colors of a page to be displayed at a client device, the apparatus comprising:
a processor; and
a memory storing instructions that, when executed by the processor, cause the apparatus to perform steps that include:
receiving, from the client device, i) a command to retrieve the page
and ii) an identifier corresponding to a type of web browser on the client device;
determining, based on the identifier, whether the web browser supports color management of images;
when the web browser supports color management of images:
preserving a current color profile of a page element of the page;
when the web browser does not support color management of images:
associating a color profile to an untagged page element of the page by converting a color value of the untagged page element of the page according to the color profile, wherein associating the color profile allows for a consistent display of color at the web browser; and
transmitting the page to the client device.

10. The apparatus of claim 9, wherein the color profile is an International Color Consortium (ICC) sRGB color profile.

11. The apparatus of claim 9, wherein the
page includes a plurality of page elements corresponding to images of the page.

12. The apparatus of claim 9, wherein the page element is a cascading style sheet (CSS) graphical element.

13. The apparatus of claim 9, wherein the untagged page element does not include an accompanying color profile before the converting of the color value of the untagged page element.

14. The apparatus of claim 9, wherein the color profile corresponds to a device specific color profile.

15. The apparatus of claim 9, wherein the color value corresponds to a previous color profile associated with the page element.

16. The apparatus of claim 9, wherein both original page elements and modified page elements are transmitted to the client device.

17. A non-transitory computer readable medium configured to store instructions that, when executed by a processor of a computing device, cause the computing device to perform steps that include:
receiving, from a client device, i) a command to retrieve the page and ii) an identifier corresponding to a type of web browser on the client device;
determining, based on the identifier, whether the web browser supports color management of images;
when the web browser supports color management of images:
preserving a current color profile of a page element of the page;
when the web browser does not support color management of images:
associating a color profile to an untagged page element of the page
by converting a color value of the untagged page element of the page according to the color profile, wherein associating the color profile allows for a consistent display of color at the web browser; and
transmitting the page to the client device.

18. The non-transitory computer readable medium of claim 17, wherein the color profile is an International Color Consortium (ICC) sRGB color profile.

19. The non-transitory computer readable medium of claim 17, wherein the color value of the page element is a World Wide Web Consortium (W3C) Cascading Style Sheet (CSS) RGB triple of hexadecimal values.

20. The non-transitory computer readable medium of claim 17, wherein the color profile corresponds to a device specific color profile.

21. The non-transitory computer readable medium of claim 17, wherein the untagged page element does not include an accompanying color profile before the converting of the color value of the untagged page element.

22. The non-transitory computer readable medium of claim 17, wherein the color profile corresponds to a device specific color profile.

23. The non-transitory computer readable medium of claim 17, wherein the color value corresponds to a previous color profile associated with the page element.

24. The non-transitory computer readable medium of claim 17, wherein the steps further include transmitting both original page elements and modified page elements to the client device.

* * * * *